United States Patent
Büttner et al.

(10) Patent No.: US 12,149,356 B2
(45) Date of Patent: Nov. 19, 2024

(54) METHOD FOR CYCLICALLY TRANSMITTING DATA BETWEEN COMMUNICATION SUBSCRIBERS ON A DATA TRANSMISSION CHANNEL, AND DATA TRANSMISSION SYSTEM

(71) Applicant: Beckhoff Automation GmbH, Verl (DE)

(72) Inventors: Holger Büttner, Berlin (DE); Daniel Schlotthauer, Berlin (DE); Marcel Peters, Berlin (DE)

(73) Assignee: Beckhoff Automation GmbH, Verl (DE)

( * ) Notice: Subject to any disclaimer, the term of this patent is extended or adjusted under 35 U.S.C. 154(b) by 300 days.

(21) Appl. No.: 17/830,856

(22) Filed: Jun. 2, 2022

(65) Prior Publication Data

US 2022/0294565 A1 Sep. 15, 2022

Related U.S. Application Data

(63) Continuation of application No. PCT/EP2020/085788, filed on Dec. 11, 2020.

(30) Foreign Application Priority Data

Dec. 11, 2019 (DE) ...................... 10 2019 133 894.8

(51) Int. Cl.
*H04L 1/08* (2006.01)
*H04L 1/00* (2006.01)
(Continued)

(52) U.S. Cl.
CPC .............. *H04L 1/08* (2013.01); *H04L 1/0026* (2013.01); *H04L 1/0027* (2013.01);
(Continued)

(58) Field of Classification Search
CPC . H04L 1/00; H04L 1/08; H04L 1/0023; H04L 1/0026; H04L 1/0001;
(Continued)

(56) References Cited

U.S. PATENT DOCUMENTS 5,084,877 A * 1/1992 Netravali ............... H04L 1/1809
370/473
7,042,833 B1 * 5/2006 George .................. H04M 11/06
370/216

(Continued)

FOREIGN PATENT DOCUMENTS

CN 101361310 A 2/2009
CN 109032516 A 12/2018
(Continued)

OTHER PUBLICATIONS

"EtherCAT—the Ethernet Fieldbus," EtherCAT Technology Group, Nov. 2012, 21 pages.
(Continued)

*Primary Examiner* — Warner Wong
(74) *Attorney, Agent, or Firm* — Dorsey & Whitney LLP

(57) ABSTRACT

In a data-transmission system, a first amount of data can be transmitted in each transmission cycle. A data generator provides a second amount of data for each transmission cycle. The first amount of data exceeds the second amount of data by a percentage. The data generator transmits the data provided by the data generator to a data processor at the data transmission rate of the data-transmission channel. The data processor processes the data received from the data generator on the data-transmission channel, delayed by the number of transmission cycles required for the data generator to respond to a command from the data processor. The data processor indicates a transmission cycle as faulty with the aid of a repeat command if an error has occurred in the data transmission, and the data generator repeats the trans-
(Continued)

mission of the data of the cycle indicated as faulty upon receiving the repeat command.

18 Claims, 5 Drawing Sheets

(51) Int. Cl.
*H04L 12/40* (2006.01)
*H04L 69/40* (2022.01)

(52) U.S. Cl.
CPC .......................... *H04L 2001/0094* (2013.01); *H04L 12/40169* (2013.01); *H04L 69/40* (2013.01)

(58) Field of Classification Search
CPC ........... H04L 1/0027; H04L 2001/0092; H04L 2001/0094; H04L 1/1812; H04L 1/1816; H04L 1/1819; H04L 1/0072; H04L 5/0082; H04L 12/40169; H04L 12/40176; H04L 25/08; H04L 41/06; H04L 69/40; H04B 1/0466; H04B 10/03; H04B 10/07; H04B 10/077; H04B 17/296
See application file for complete search history.

(56) References Cited

U.S. PATENT DOCUMENTS

| | | | |
|---|---|---|---|
| 7,373,578 B2 | 5/2008 | Steindl | |
| 7,836,340 B2 * | 11/2010 | Schuetz ................ | G06F 11/004 714/48 |
| 8,230,289 B2 | 7/2012 | Hekstra-Nowacka et al. | |
| 9,747,048 B2 | 8/2017 | Pawlowski | |
| 10,270,705 B1 | 4/2019 | Adelman et al. | |
| 10,323,588 B2 | 6/2019 | Vanderwege | |
| 10,454,704 B1 * | 10/2019 | Nakagawa ............ | H04L 7/0012 |
| 10,484,138 B2 | 11/2019 | Büttner et al. | |
| 11,190,455 B2 | 11/2021 | Falk et al. | |
| 2003/0032439 A1 | 2/2003 | Harris et al. | |
| 2004/0027235 A1 * | 2/2004 | Steindl ................... | H04L 1/1803 340/9.1 |
| 2005/0034015 A1 * | 2/2005 | Hashimoto ......... | G06F 11/0736 714/E11.003 |
| 2005/0243743 A1 * | 11/2005 | Kimura ................. | H04L 1/1841 370/278 |
| 2006/0165189 A1 * | 7/2006 | Tamaki ................. | H04L 1/0007 375/260 |
| 2006/0215563 A1 | 9/2006 | Trainin | |
| 2012/0057479 A1 | 3/2012 | Maruyama et al. | |
| 2014/0310466 A1 * | 10/2014 | Vorbach ................ | G06F 13/385 711/119 |
| 2015/0261474 A1 * | 9/2015 | Vorbach ................ | G06F 3/0608 710/52 |
| 2018/0302899 A1 * | 10/2018 | Aijaz ..................... | H04L 1/1887 |
| 2019/0020444 A1 * | 1/2019 | Fr?berg Olsson .... | H04L 1/1861 |
| 2019/0068326 A1 * | 2/2019 | Sonobe ................. | H04L 1/1819 |
| 2020/0081857 A1 * | 3/2020 | Barner ................. | G06F 13/4009 |
| 2021/0153117 A1 * | 5/2021 | Nam ................. | H04W 52/0258 |
| 2022/0346106 A1 * | 10/2022 | Sinn ....................... | H04W 24/08 |

FOREIGN PATENT DOCUMENTS

| | | | | |
|---|---|---|---|---|
| DE | 102015117973 A1 | 4/2016 | | |
| DE | 102015117937 B3 | 1/2017 | | |
| DE | 102016121019 A1 | 5/2018 | | |
| EP | 1179908 A1 | 2/2002 | | |
| EP | 2575280 A1 | 4/2013 | | |
| WO | WO-2009089869 A1 * | 7/2009 | .......... | H04L 12/407 |
| WO | WO-2018137621 A1 * | 8/2018 | .......... | H04L 1/1812 |
| WO | 2019166079 A1 | 9/2019 | | |

OTHER PUBLICATIONS

International Preliminary Report on Patentability dated Jan. 31, 2022 in connection with International Patent Application No. PCT/EP2020/085788, 78 pages including English translation.

International Search Report and Written Opinion dated Feb. 25, 2021 in connection with International Patent Application No. PCT/EP2020/085788, 27 pages including English translation.

Office Action dated Oct. 27, 2020 in connection with German patent application No. 10 2019 133 894.8, 13 pages Including English translation.

Office Action dated Jun. 27, 2024 in connection with Chinese Patent Application No. 202080085583.6, 7 pages including English translation.

* cited by examiner

Fig. 3

|  |  |  |  |  |  |  |  |
|---|---|---|---|---|---|---|---|
| Zyklus 0 | E=0 R=0 | X | F=0 |  |  |  |  |
| Zyklus 1 | E=0 R=0 | X+1 | F=0 | X |  |  |  |
| Zyklus 2 | E=1 R=0 |  | F=0 | X+1 |  |  |  |
| Zyklus 3 | E=0 R=0 |  | F=0 | ID=A1 | D11 | D12 | D13 | D14 |
| Zyklus 4 | E=1 R=0 |  | F=1 | ID=A1 | D11 | D12 | D13 | D14 |
| Zyklus 5 | E=1 R=0 |  | F=1 | ID=A2 | D22 | D23 | D24 | D21 |
| Zyklus 6 | E=1 R=0 |  | F=1 | ID=A3 | D33 | D34 | D41 | D32 |
| Zyklus 7 | E=1 R=0 |  | F=1 | ID=A4 | D44 | D51 | D52 | D43 |
| Zyklus 8 | E=1 R=0 |  | F=0 | ID=A5 | D61 | D62 | D63 | D54 |
|  |  |  |  |  | D71 | D72 | D73 | D64 |

| Data Cycle 01 | | | | |
|---|---|---|---|---|
| D11 | D12 | D13 | D14 |
| Data Cycle 02 | | | |
| D21 | D22 | D23 | D24 |
| Data Cycle 03 | | | |
| D31 | D32 | D33 | D34 |
| Data Cycle 04 | | | |
| D41 | D42 | D43 | D44 |
| Data Cycle 05 | | | |
| D51 | D52 | D53 | D54 |
| Data Cycle 06 | | | |
| D61 | D62 | D63 | D64 |
| Data Cycle 07 | | | |
| D71 | D72 | D73 | D74 |

Fig. 4

| | | | | | | | Data Cycle 01 | D11 | D12 | D13 | D14 |
| | | | | | | | Data Cycle 02 | D21 | D22 | D23 | D24 |
| | | | | | | | Data Cycle 03 | D31 | D32 | D33 | D34 |
| | | | | | | | Data Cycle 04 | D41 | D42 | D43 | D44 |
| | | | | | | | Data Cycle 05 | D51 | D52 | D53 | D54 |
| | | | | | | | Data Cycle 06 | D61 | D62 | D63 | D64 |
| | | | | | | | Data Cycle 07 | D71 | D72 | D73 | D74 |
| | | | | | | | Data Cycle 08 | D81 | D82 | D83 | D84 |
| | | | | | | | Data Cycle 09 | D91 | D92 | D93 | D94 |
| | | | | | | | Data Cycle 10 | D101 | D102 | D103 | D104 |
| | | | | | | | Data Cycle 11 | D111 | D112 | D113 | D114 |
| | | | | | | | Data Cycle 12 | D121 | D122 | D123 | D124 |

| Zyklus | | | | | | | |
|---|---|---|---|---|---|---|---|
| Zyklus 4 | E=1 R=0 | | F=1 | ID=A1 | D11 | D12 | D13 | D14 |
| Zyklus 5 | E=1 R=0 | | F=1 | ID=A2 | D21 | D22 | D23 | |
| Zyklus 6 | E=1 R=1 | ID=A2 | F=1 | ID=A3 | D33 | D34 | D24 | D14 |
| Zyklus 7 | E=1 R=0 | | F=1 | ID=A2 | D22 | D23 | D24 | D21 |
| Zyklus 8 | E=1 R=0 | | F=1 | ID=A4 | D44 | D41 | D42 | D43 |
| Zyklus 9 | E=1 R=0 | | F=1 | ID=A5 | D61 | D51 | D52 | D31 |
| Zyklus 10 | E=1 R=0 | | F=1 | ID=A6 | D72 | D62 | D63 | D54 |
| Zyklus 11 | E=1 R=1 | ID=A6 | F=1 | ID=A7 | D83 | D73 | D74 | D71 |
| Zyklus 12 | E=1 R=0 | | F=1 | ID=A6 | D72 | D84 | D91 | D82 |
| Zyklus 13 | E=1 R=0 | | F=1 | ID=A8 | D94 | D101 | D74 | D93 |
| | | | | | | D102 | D81 | D82 |
| | | | | | | D103 | D104 |

Fig. 5

METHOD FOR CYCLICALLY TRANSMITTING DATA BETWEEN COMMUNICATION SUBSCRIBERS ON A DATA TRANSMISSION CHANNEL, AND DATA TRANSMISSION SYSTEM

CROSS-REFERENCE TO RELATED APPLICATIONS

This is a continuation of International Patent Application No. PCT/EP2020/085788, filed 11 Dec. 2020, entitled "Method for Cyclically Transmitting Data Between Communication Subscribers on a Data Transmission Channel, and Data Transmission System," which claims the priority of German patent application DE 10 2019 133 894.8, filed 11 Dec. 2019, entitled "Verfahren zum zyklischen Übertragen von Daten zwischen Kommunikationsteilnehmern auf einem Datenübertragungskanal and Datenübertragungssystem," each of which are incorporated by reference herein, in the entirety and for all purposes.

FIELD

The present invention relates a method for cyclically transmitting data between communication subscribers on a data-transmission channel and a data-transmission system.

BACKGROUND

In manufacturing and process automation, decentrally arranged devices of a machine periphery such as I/O modules, transmitters, drives, valves and operator terminals communicate with controllers via a powerful real-time communication network. All devices, also referred to as communication subscribers in the following, are connected to one another via a data-transmission channel, preferably a field bus, wherein the data exchange is usually carried out on the basis of the master-slave principle.

The active communication subscribers at the field bus are the controllers. They possess a bus access authorization and determine the data transfer. The active communication subscribers are also referred to as master subscribers. The passive communication subscribers are usually the machine-periphery devices. They do not have any bus access authorization and may only acknowledge received data or transfer data to a master subscriber at the latter's request. The passive communication subscribers are also referred to as slave subscribers.

Control processes in manufacturing and process automation are usually composed of tasks to be carried out cyclically. These tasks are carried out in such a way that the slave subscribers, which form the machine periphery, supply input process data via the field bus to the master subscriber, which controls the process. In the master subscriber, output process data are then generated according to the task to be carried out and transmitted back to the slave subscribers via the field bus.

The data are usually exchanged between the communication subscribers in the form of discrete data packets, which are also referred to as telegrams in the following. The telegram structure is usually based on the Ethernet standard.

In practice, a frequent problem that a telegram is not correctly transmitted from one communication subscriber to another communication subscriber. Possible causes may be a malfunction in the sending communication subscriber, a brief interruption of the data-transmission channel and a malfunction in the receiving communication subscriber. However, a loss of data may lead to errors when carrying out the control task.

To counteract interferences in data transmission, the field-bus system may repeat telegrams that have been transmitted incorrectly. This may be realized in such a way that the master subscriber sends out a telegram to a slave subscriber and then waits for a response telegram. The slave subscriber may reply with a separate telegram or with the same telegram if the slave subscriber processes the telegrams on the fly. If the master subscriber does not receive a response within a specified time, it retransmits the originally sent telegram. Such a method is e.g. described in DE 10 2016 121 019 A1, in which a master subscriber sends a telegram that has already been sent a second time if the receipt of the first telegram sent has not been acknowledged by the slave subscriber.

Another option of implementation is for the master subscriber to send a telegram sequence instead of a single telegram, which comprises a plurality of telegrams essentially having the same content. For successful transmission, it is then sufficient for the slave subscriber to receive at least one of the telegrams from the telegram repetition sequence. Such a method is e.g. described in DE 10 2015 117 937 A1.

If the communication subscriber has to trigger a specific action in response to the successful receipt of a telegram, the point in time at which the action is executed depends on when the repeat telegram is received in the event of an error or on which telegram of a telegram sequence the communication subscriber responds to. This may be particularly problematic if a plurality of communication subscribers are to be operated synchronously in the field-bus system.

U.S. Pat. No. 7,373,578 B2 describes a method for loss-free data transmission with a telegram repetition, in which the telegram repetition is postponed to the next communication cycle in the event of a disrupted communication, so that the bandwidth of the communication cycle remains constant. However, this procedure cannot guarantee that the receiver receives current data in every communication cycle.

SUMMARY

The invention provide loss-free cyclic transmission of data between communication subscribers on a data-transmission channel.

A method cyclically transmits data between communication subscribers on a data-transmission channel. The data-transmission channel is operated at a data-transmission rate with the aid of which a first amount of data may be transmitted in each transmission cycle. A communication subscriber acts as a data processor and a further communication subscriber acts as a data generator. The data generator provides a second amount of data for each transmission cycle. The first amount of data exceeds the second amount of data by a percentage. The data generator transmits the data provided by the data generator to the data processor at the data-transmission rate of the data-transmission channel. The data processor processes the data received by the data generator on the data-transmission channel with a delay of the number of transmission cycles that the data generator needs in order to react to a command of the data processor. The data processor indicates to the data generator that a transmission cycle is faulty if an error has occurred in the transmission cycle during data transmission with the aid of a repeat command. The data generator, upon receiving the repeat command, repeats the transmission of the data of the transmission cycle indicated to be faulty by the data processor.

A data-transmission system cyclically transmits data between communication subscribers on a data-transmission channel. The data-transmission channel is embodied to be operated at a data transmission rate at which a first amount of data may be transmitted in each transmission cycle. A communication subscriber acts as a data processor and another communication subscriber acts as a data generator. The data generator is embodied to provide a second amount of data for each transmission cycle. The first amount of data exceeds the second amount of data by a percentage. The data generator is embodied to transmit the data provided by the data generator to the data processor at the data transmission rate of the data-transmission channel. The data processor is embodied to process the data received from the data generator on the data-transmission channel with a delay of the number of transmission cycles the data generator needs to respond to a command of the data processor. The data processor the data processor is embodied to indicate a transmission cycle as faulty to the data generator with the aid of a repeat command if a fault has occurred in the data transmission in the transmission cycle. The data generator is embodied, upon receiving the repeat command, to repeat the data transmission of the data of the transmission cycle indicated as faulty by the data processor.

A method cyclically transmits data between communication subscribers on a data-transmission channel. The data-transmission channel is operated at a data-transmission rate with the aid of which a first amount of data may be transmitted in each transmission cycle. A communication subscriber acts as a data processor and a further communication subscriber acts as a data generator. The data generator provides a second amount of data for each transmission cycle. The first amount of data exceeds the second amount of data by a percentage, wherein the percentage by which the first amount of data exceeds the second amount of data, when multiplied by n, at least corresponds to the second amount of data, n being an integer larger than 1.

The data generator transmits the n+1 first amounts of data provided by the data generator to the data processor for a communication cycle of n+1 transmission cycles at the data-transmission rate of the data-transmission channel in such a way that the n+1 amounts of data provided by the data generator for the communication cycle of n+1 transmission cycles are transmitted in n transmission cycles having n second amounts of data on the data-transmission channel, so that a transmission cycle of the n+1 transmission cycles of the communication cycle on the data-transmission channel with the second amount of data is redundant with regard to a transmission of data of the n+1 first amount of data provided by the data generator for the n+1 transmission cycles of the communication cycle and may be used for a repetition of the transmission of the second amount of data from a transmission cycle of the already performed transmission cycles indicated to be faulty on the data-transmission channel.

The data processor processes the data received by the data generator on the data-transmission channel with a delay of the number of transmission cycles that the data generator needs in order to react to a command of the data processor. The data processor indicates to the data generator that a transmission cycle is faulty if an error has occurred in the transmission cycle during data transmission with the aid of a repeat command. The data generator, upon receiving the repeat command, repeats the transmission of the transmission cycle in the communication cycle indicated to be faulty by the data processor.

EXAMPLES

In a data-transmission system, data are transmitted cyclically between communication subscribers on a data-transmission channel that is operated at a data transmission rate at which an initial amount of data may be transmitted in each transmission cycle. In this context, one communication subscriber acts as a data processor and another communication subscriber acts as a data generator. The data generator provides a second amount of data for each transmission cycle. The first amount of data exceeds the second amount of data by a percentage. The data generator transfers the data provided by the data generator to the data processor at the data transmission rate of the data-transmission channel. The data processor processes the data received from the data generator on the data-transmission channel delayed by the number of transmission cycles that the data generator needs to respond to a command from the data processor. The data processor indicates a transmission cycle as faulty to the data generator with a repeat command if an error has occurred when transmitting data in the transmission cycle, while the data generator repeats the data transmission of the data of the transmission cycle indicated as faulty by the data processor when the repeat command is received.

The first amount of data indicates how much data may be transmitted per transmission cycle. The second amount of data is generated by the data generator per transmission cycle. The generated second amounts of data are then transmitted with data packets that may have the size of the first amount of data, i.e. are larger than the second amount of data, so that more than the second amount of data may be transmitted with a transmitted data packet in one transmission cycle. This provides a redundant transmission cycle in each communication cycle, which may be used to repeat a faulty data transmission.

With this approach, data is transmitted without loss. Furthermore, the bandwidth required for each communication cycle remains constant even if a data transmission of a transmission cycle is repeated. Furthermore, it is ensured that the data processor receives new data in each communication cycle. The dead time by which the data processor is delayed in starting to process the data received from the data generator on the data-transmission channel may remain as short as possible and may be matched precisely to the number of transmission cycles that the data generator needs to respond to a command from the data processor.

The percentage by which the first amount of data exceeds the second amount of data may equal n times the second amount of data, wherein n is an integer larger than 1. The data processor then discards the data received from the data generator in a transmission cycle if the data generator transmits less than the first data amount in the transmission cycle. This approach provides a simple way to ensure that the data processor receives new data in each communication cycle while providing a redundant transmission cycle for a possible retransmission of an erroneous data transmission.

The data processor may be embodied to send a processor-data unit in each transmission cycle, to which the data generator responds with a generator-data unit in the respective transmission cycle, wherein the processor-data unit contains a data element with the aid of which the repeat command is transmitted. If the protocol used in the data-transmission system allows for data to be processed in passing, both the processor-data unit and the generator-data unit may be transmitted with the aid of a single telegram in one transmission cycle. The EtherCAT field-bus protocol allows such data to be processed in passing. Alternatively, it is also possible to send the processor-data unit as well as the generator-data unit in one transmission cycle with the aid of a separate telegram. Data transmission with a processor-data unit and a generator-data unit in one transmission cycle thus provides maximum flexibility in the embodiment of the data-transmission system.

Within the framework of an initialization sequence, the dead time may be determined, which corresponds to the number of transmission cycles required by the data generator to respond to a command from the data processor. The transmission cycle is then embodied to provide a data value sequence in successive processor-data units of the initialization sequence, in which an individual data value is assigned to each transmission cycle of the initialization sequence, wherein the data generator enters the data value into the next generator-data unit sent to the data processor after it has been determined. This procedure may be used to easily and reliably determine the dead time that determines the delay set in the data processor for processing user data from the data generator.

The data processor may be arranged to enter a data element into the processor-data unit, with the aid of which an operational status command is transmitted indicating that the transmission cycle is part of an initialization sequence or part of a data transmission sequence. The data processor may be further embodied to enter a data element into the processor-data unit that is used to transmit a data command with the aid of which the second amount of data generated by the data generator in a transmission cycle may be changed. The data generator may be embodied to enter a data element into the generator-data unit, with the aid of which a transmission-status command is transmitted that indicates whether the data elements provided in the generator-data unit for user data are completely occupied with user data. Alternatively, the data generator may be embodied to enter a data element in the generator-data unit with which a transmission-status command is transmitted that indicates the number of data elements occupied by user data in the generator-data unit.

With such an embodiment of the processor-data unit or the generator-data unit, a repeat may be easily carried out in each communication cycle in a redundant transmission cycle in case of a faulty data transmission in one of the other transmission cycles.

In the data-transmission system, the data generator may have a buffer for holding the generated second amount of data in the form of a ring buffer. In the ring buffer, the second amount of data may be stored one after the other for successive transmission cycles and may be addressed easily. With respect to the communication cycle time and the memory size of the ring buffer, it should be noted that no data in the ring buffer are overwritten that have not yet been transmitted from the data generator to the data processor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 shows a first sequence for a cyclic transmission of user data between the data processor and the data generator in the data transmission system according to FIG. 1.

FIG. 4 shows a second sequence for a cyclic transmission of user data between the data processor and the data generator in the data transmission system according to FIG. 1.

FIG. 5 shows a third sequence for a cyclic transmission of user data between the data processor and the data generator in the data transmission system according to FIG. 1.

DETAILED DESCRIPTION

Figure 1:
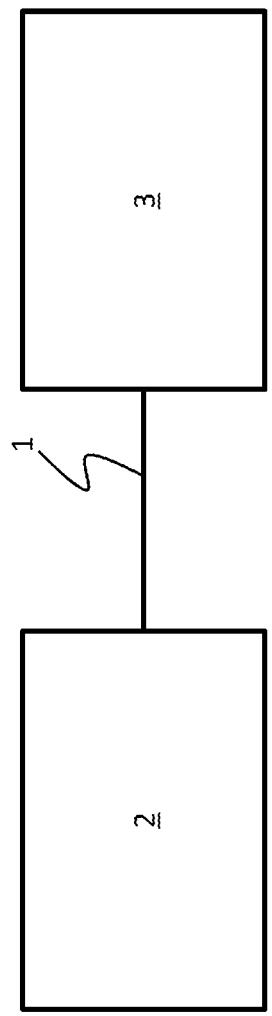
FIG. 1 shows in its most general form the structure of a data-transmission system for the cyclic transmission of data between two communication subscribers on a data-transmission channel, wherein one communication subscriber acts as the data processor and the other communication subscriber acts as the data generator.

The data-transmission system for cyclic transmission of data between communication subscribers on a data-transmission channel is explained for applications in the field of automation technology, i.e. the control and monitoring of technical processes with the aid of software, but is not limited to such an application.

In manufacturing and process automation, controllers communicate with a distributed sensor/actuator level via a local communication network. The communication networks used are field-bus systems and may be embodied in different topologies, e.g. ring, star, line or tree topology.

In field-bus systems, a distinction is usually made between active and passive communication subscribers. The active communication subscribers in the field-bus system are the controllers that determine the data traffic as master subscribers. The master subscribers have access authorization to the data-transmission channel and may thus independently output data to the data-transmission channel. The passive communication subscribers in the field-bus system are the sensors and actuators that receive data as slave subscribers or are allowed to transmit data to a master subscriber upon request.

The programs that control, monitor and regulate technical processes generally have a plurality of control objects, each of which has input and output process images. The process data are assigned to the sensors and actuators, i.e. the slave subscribers, which form the interfaces to the process. The input process data are requested by the controllers, i.e., the master subscribers on the field bus, from the sensors via the data-transmission channel, processed upon receipt by the controllers based on the control objects, in order to then be transmitted to the actuators as the output process data via the data-transmission channel.

The process data exchange on the data-transmission channel generally takes place in the form of discrete data packets, also referred to as telegrams in the following, which are usually transmitted cyclically. The telegram structure is usually based on the Ethernet standard, wherein the transmission protocol used on the field bus preferably guarantees real-time transmission with low jitter.

In order to transmit data without loss and furthermore to keep the bandwidth required for each communication cycle constant even if a data transmission of a transmission cycle is repeated, the following procedure is used:

In a data-transmission system, data is transmitted cyclically on a data-transmission channel that is operated at a data transmission rate at which a first amount of data is transmittable in each transmission cycle. A data generator further provides a second amount of data for each transmission cycle, wherein the first amount of data exceeds the second amount of data by a percentage.

The data generator transmits the data provided by the data creator to a data processor at the data transmission rate of the data-transmission channel. The data processor processes the data received from the data generator on the data-transmission channel delayed by the number of transmission cycles that the data generator needs to respond to a command from the data processor.

When an error has occurred in the transmission of data in the transmission cycle, the data processor indicates a transmission cycle as faulty to the data generator with a repeat command, and the data generator, upon receiving the repeat command, repeats the data transmission of the data of the transmission cycle indicated as faulty by the data processor.

The percentage by which the first amount of data exceeds the second amount of data may equal n times the second amount of data, wherein n is an integer larger than 1. The data processor then discards the data received from the data generator in a transmission cycle if the data generator transmits less than the first data amount in the transmission cycle. This approach provides a simple way of ensuring that the data processor receives new data in each communication cycle while providing a redundant transmission cycle for a possible repeat of an erroneous data transmission.

However, it is not in principle necessary that the percentage by which the first amount of data exceeds the second amount of data is exactly equal to the second amount of data multiplied n times. The data processor may then be embodied in such a way that if data are received multiple times, said data are processed only once, however. This may be carried out in such a way that the data processor checks whether the data received from the data generator in a transmission cycle are already known from a previous transmission cycle and are available to the data processor. The data processor then discards either the data already present or the data received again.

FIG. 1 shows in its most general form the structure of a data-transmission system for cyclically transmitting data between two communication subscribers on a data-transmission channel 1 according to the above-described method. One communication subscriber is the data processor 2 and the other communication subscriber is the data generator 3. A transmission cycle on the data-transmission channel 1 is executed such that data are exchanged between the data processor 2 and the data generator 3 in both directions.

In relation to an automation system as a data-transmission system, the data-transmission channel 1 is then the field bus, wherein the data processor 2 represents a controller which, as a master subscriber, determines the data traffic on the field bus. The data generator 3, on the other hand, is a slave subscriber on the field bus, i.e. a machine peripheral device that transmits data to the master subscriber upon request. As a rule, a large number of data generators 3, i.e. slave subscribers, are connected to the field bus, i.e. the data-transmission channel 1, and are addressed in parallel by the data processor 2, i.e. the master subscriber.

If the protocol used in the data-transmission system allows for data processing on the fly, a single telegram in a transmission cycle may be used to transmit data both from the data processor 2 to the data generator 3 and from the data generator 3 to the data processor 2. The field bus protocol EtherCAT allows for such a data processing in one cycle. Alternatively, it is also possible for each communication subscriber, i.e. both the data processor 2 and the data generator 3, to send data in a transmission cycle using a separate telegram.

If synchronous data processing in the data processor 2 is desired, in which the data processor 2 processes new data in each communication cycle, which is a particular objective when processing process data in the context of control tasks, it must be taken into account how many transmission cycles the data generator 3 requires in a data exchange in order to respond to a command in the received telegram after receiving a telegram from the data processor 2.

The data processor 2 is then configured to process data received on the data-transmission channel 1 delayed by the number of transmission cycles that the data generator 3 needs to respond to the command of the data processor 2. In this way, it may be ensured that, if the data processor 2 indicates to the data generator 3 via a repeat command that the data transmission in a transmission cycle is faulty, the data processor 2 also receives the data retransmitted by the data generator 3 after receiving the repeat command before the data processor 2 executes the processing of this data.

As a rule, it is desirable to be able to keep the dead time, which must at least be configured in the data processor 2, as short as possible. If each communication subscriber, i.e. both the data processor 2 and the data generator 3 send data in a transmission cycle via their own telegram, the retransmission of the data by the data generator 3 in response to the repeat command of the data processor 2 may be carried out in one and the same transmission cycle, since the telegrams of the two communication subscribers may be executed with a time offset to each other. The data generator 3 then has sufficient time to evaluate the telegram of the data processor 2 before the data generator 3 sends its telegram in the transmission cycle to execute a telegram repeat with the aid of the telegram in response to a repeat command of the data processor 2. The minimum dead time for processing the data with the aid of the data processor 2 is in this case one transmission cycle. However, if a corresponding setting has been carried out at the data generator 3, the reaction of the data generator 3 may not take place until the following transmission cycle or until an even later transmission cycle.

If a single telegram is used to transmit data from the data processor 2 to the data generator 3 as well as data from the data generator 3 to the data processor 2 in one transmission cycle, it is necessary, if a minimum dead time for the processing of the data by the data processor 2 of only one transmission cycle is to be achieved, to embody the passing of the telegram through the data generator 3 in such a way that the data generator 3 has sufficient time to evaluate the commands sent by the data processor 2 with the aid of the telegram. This may be achieved by a telegram structure in which the commands of the data processor 2 are arranged in a front section of the telegram, but the data generator 3 enters its data into the telegram in a rear section only. The data generator 3 may then interpret the commands of the data processor 2 sent with the aid of the telegram before the data generator 3 enters its data into the telegram. In this way, data generator 3 may resend the data from the faulty transmission cycle with the aid of the telegram, with the aid of which the data generator 3 has sent a repeat command.

If such a command interpretation is not possible in the data generator 3 during the passing of the telegram, the reaction of the data generator 3 to a repeat command, namely a retransmission of the data of the faulty transmission cycle, may not take place until the passing of the telegram in the following transmission cycle or until the passing of the telegram in an even later transmission cycle.

The data generator 3 usually generates the same amount of data in each transmission cycle. The data processor 2 is then also configured in such a way that the data processor 2 processes at least the amount of data provided by the data generator 3 in each transmission cycle. Alternatively, however, different amounts of data may be generated by the data generator 3 for different transmission cycles. The processing capacity of the data processor 2 is then matched to the amount of data supplied by the data generator 3 in the transmission cycle.

The data generated by the data generator 3 is stored locally in a buffer memory in order to be sent as part of a transmission cycle upon request by the data processor 2. The buffer in the data generator 3 may be embodied as a ring buffer. In a ring buffer, the data is stored one after the other. When the end of the ring buffer is reached, buffering resumes at the top.

With regard to the communication cycle time and the memory size of the ring buffer, it must be ensured that no data in the ring buffer is overwritten that has not yet been transmitted from the data generator 3 to the data processor 2. Thus, it has to be ensured that no more new data is generated by the data generator 3 on average, i.e. considered over several communication cycles, than may be transmitted from the data generator 3 to the data processor 2 within the scope of said several communication cycles.

In the following, the procedure for loss-free cyclic transmission of data between the data generator 3 and the data processor 2 on the data-transmission channel 1, in which a constant bandwidth of the communication cycle is guaranteed even if the data transmission is repeated, is described by means of an example. In this context, the specific embodiment of the data transmission technique is not discussed. In particular, it is possible to use the described procedure for a field bus for industrial applications as defined in the IEC 61158 standard. Possible protocols for a field bus are compiled in the IEC 61784-1 and IEC 61784-2 standards.

For the example, it is assumed that the data generator 3 provides a data packet of four data fields in each transmission cycle, each data field containing a fixed number of data elements, e.g. in the scope of one byte. The data elements of the four data fields are each user data, e.g. process data, which are intended for processing by the data processor 2 in the context of control objects.

Figure 2:
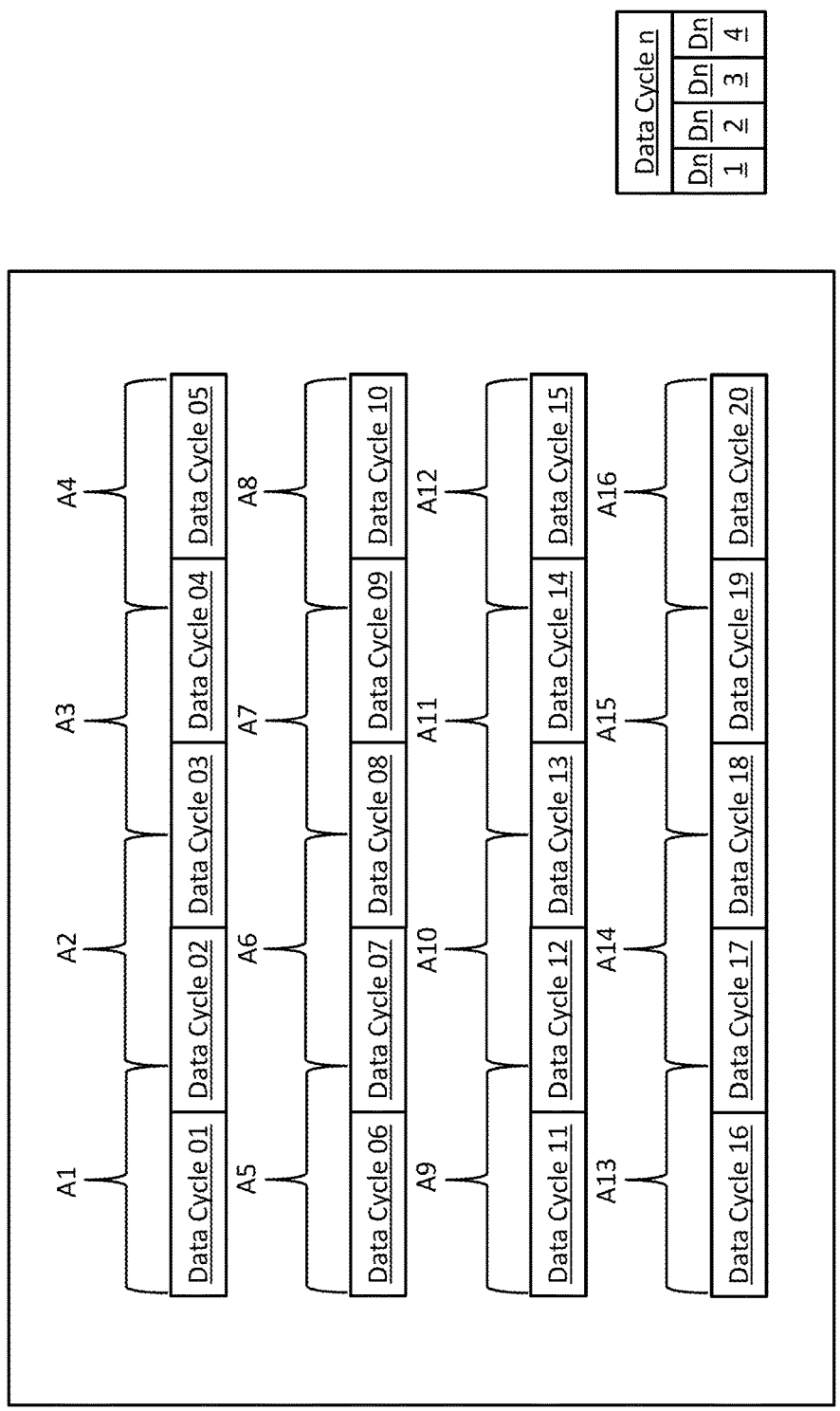
FIG. 2 shows an embodiment of a buffer for the data generator in the data-transmission system according to FIG. 1 in the form of a ring buffer.

FIG. 2 shows an embodiment of the buffer for the data generator 3 for recording the data generated by the data generator 3 in the form of a ring buffer. The ring buffer is embodied to hold data provided by the data generator 3 from 20 transmission cycles. In FIG. 2, the individual data packets in the ring buffer are referred to as Data Cycle 01-20. Then, in an additional section, FIG. 2 further shows the subdivision of any data packet in the ring buffer referred to as Data Cycle with the number n into the four data fields. Each data field is indicated by the letter D, by the number n of the data package Data Cycle and by a consecutive number 1 to 4.

It is further assumed that the data-transmission channel 1 is operated at a data transmission rate at which an amount of data of five data fields is transmittable from the data generator 3 to the data processor 2 in each transmission cycle. The amount of data that may be transmitted in a transmission cycle thus exceeds the amount of data generated by the data generator 3 for a transmission cycle by one quarter or, expressed as a percentage, by 25%. Thus, the amount of data generated by the data generator 3 for five transmission cycles may be transmitted with the aid of four transmission cycles. The bandwidth of the communication cycle in the data-transmission system is five transmission cycles, wherein one of the five transmission cycles is redundant with respect to the transmission of the amount of data provided by the data generator 3 for the five transmission cycles, and may be used to repeat the transmission of data from a transmission cycle detected as faulty.

In the example, the first amount of data that may be transmitted from the data generator 3 to the data processor 2 in one transmission cycle exceeds the second amount of data generated by the data generator 3 for one transmission cycle by a percentage that, multiplied n times, corresponds to the second amount of data, wherein n is an integer larger than 1. In the example, the percentage share is 25% and n=4. However, it is not necessary in principle that the percentage share by which the first amount of data exceeds the second amount of data, multiplied n times, corresponds exactly to the second amount of data.

Sixteen (16) memory addresses A1-A16 are assigned to the ring buffer shown in FIG. 2 for transmitting the data from the data generator 3 that may be stored in the ring buffer from the 20 transmission cycles, as indicated by brackets in FIG. 2. Each memory address A1-A16 identifies a data area consisting of five data fields, the data of which may be transmitted from the data generator 3 to the data processor 2 with the aid of one transmission cycle on the data transmission channel 1.

It is further assumed that the data processor 2 sends a processor-data unit consisting of two data fields to the data generator 3 in each transmission cycle. In each transmission cycle, the data generator 3 responds to the processor-data unit of the data processor 2 with a generator-data unit consisting of seven data fields. The processor-data unit having two data fields and the generator-data unit having seven data fields may, as explained as alternatives above, be included in a single telegram or may also be transmitted as separate telegrams.

The two data fields in the processor-data unit sent by the data processor 2 in the transmission cycle are reserved for data elements, each of which is interpreted as command data.

The first data field in the processor-data unit comprises, as further shown and described by way of example later in connection with FIG. 3, at least two data elements, wherein a first command data element is an operational status command E and a second command data element is a repeat command R, each of which may assume the value 0 or the value 1. The value 0 of the operation status command E indicates that the transmission cycle is part of an initialization sequence. The value 1 of the transmission-status command E indicates that the transmission cycle is part of a data transmission sequence. The value 0 of the repeat command R indicates that the preceding transmission cycle was executed without errors. The value 1 of the repeat command R indicates that an error has occurred during data transmission in the preceding transmission cycle. In addition to the operating status command E and the repeat command R, the first data field may contain further command data elements.

The data elements in the second data field of the processor-data unit are interpreted depending on the values of the command data elements in the first data field of the processor-data unit and may be data values or address values ID. In particular, the address values ID refer to the 16 memory addresses A1-A16 of the ring buffer shown in FIG. 2.

Of the seven data fields in the generator-data unit, the first two data fields of the generator-data unit are reserved for data elements, each of which is interpreted as command data. The other five data fields in the generator-data unit serve to transmit the user data provided by the data generator 3 and buffered in the ring buffer to the data processor 2. Each user data field of the generator-data unit may accommodate a data field provided by the data generator 3 and buffered in the ring buffer.

The first data field of the generator-data unit comprises at least a transmission-status command F as a command data element, which may assume the value 0 or the value 1. The value 0 of the transmission-status command F indicates that the five user data fields of the generator-data unit are not completely occupied with data, and the value 1 of the transmission-status command F indicates that the five user data fields of the generator-data unit are completely occupied with data.

Alternatively, instead of using the value 0 or 1 to distinguish between an incomplete and a complete occupancy of the user data fields of the generator-data unit, the transmission-status command F may also always specify the exact number of occupied user data fields of the generator-data unit as a value.

The data elements in the second data field of the generator-data unit are then interpreted depending on the values of the command data elements in the first data field of the generator-data unit and may be data values or address values ID. The address values ID refer in particular to the 16 memory addresses A1-A16 of the ring buffer shown in FIG. 2.

FIG. 3 shows a first sequence of the first nine transmission cycles Zyklus 0 to Zyklus 8 for a cyclic transmission of user data between the data processor 2 and the data generator 3 on the data-transmission channel 1. In each transmission cycle, as described above, the data processor 2 transmits a processor-data unit with two data fields and the data generator 3 transmits a generator-data unit with seven data fields.

The communication cycle for a data transmission in the data-transmission system consists of five consecutive transmission cycles, as also described above. In the first sequence of transmission cycles shown in FIG. 3, a first communication cycle starts with the fifth transmission cycle Zyklus and ends with the ninth transmission cycle Zyklus 8.

Before the data transmission of the first communication cycle starts, the dead time, which corresponds to the number of transmission cycles that the data generator 3 needs to respond to a command from the data processor 2, is determined in the data-transmission system using the preceding transmission cycles in an initialization sequence. The data processor 2 is then configured in such a way that the data processor 2 processes the user data received from the data generator 3 on the data-transmission channel 1 delayed by at least the number of transmission cycles corresponding to the dead time.

In the described embodiment, the data-transmission system is embodied in such a way that the data generator 3 requires one transmission cycle for the interpretation of the command of the data processor 2.

At the beginning of the initialization sequence, the data processor 2 sends the operating status command E=0 in the first data field of the first processor-data unit in the first transmission cycle Zyklus 0, indicating that the data-transmission system is in initialization mode. In addition, the repeat command R=0 is also entered into the first data field of the first processor-data unit by the data processor 2. A data value X is transmitted in the second data field of the first processor-data unit.

As the data generator 3 has not yet evaluated the commands in the first processor-data unit in the first transmission cycle Zyklus 0 and therefore does not yet react to the commands in the first processor-data unit in the first transmission cycle Zyklus 0, the data generator 3 sends a first generator-data unit in the first transmission cycle Zyklus 0 in which the transmission-status command F=0 is only entered into the first data field. The remaining six data fields of the first generator-data unit remain free. The value 0 of the transmission-status command F indicates that the five user data fields of the generator-data unit are not completely occupied with data.

In the second transmission cycle Zyklus 1, the data processor 2 in turn sends the operating status command E=0 and the repeat command R=0 in the first data field of the second processor-data unit. In the second data field of the second processor-data unit, the data processor 2 enters a data value X+1 that is higher than the data value X of the first processor-data unit.

In initialization mode, when the operating status command E=0 is entered in the first data field of the processor-data unit, the data processor 2 proceeds in such a way that the data value in the second data field of the processor-data unit is incremented by 1 with each transmission cycle. With this procedure, a data value sequence is provided with the successive processor-data units of the initialization sequence, in which an individual data value is assigned to each transmission cycle of the initialization sequence. Instead of incrementing the data value, decrementing may also be performed. However, a sequence of data values individualized in a different way may also be entered into the second data field of the processor-data unit.

In the second transmission cycle, the data generator 3 has now evaluated the operating status command E=0 from the first processor-data unit and, in response thereto, enters the data value X from the second data field of the first processor-data unit into the second data field of the second generator-data unit in a mirrored manner. The five user data fields of the second generator-data unit continue to remain empty, which the data generator 3 indicates by the transmission-status command F=0i n the first data field of the second generator-data unit.

The data generator 3 is basically configured in such a way that, when the data generator 3 detects the operation status command E=0 in the first data field in a processor-data unit indicating that the data-transmission system is in initialization mode, the data generator 3 enters the data value in the second data field of the corresponding processor-data unit into the second data field of the next generator-data unit sent to data processor 2.

The data processor 2 then finds out during the evaluation of the second generator-data unit by the feedback of the data value X, which the data processor 2 has sent with the aid of the first processor-data unit in the first transmission cycle Zyklus 0, that the data generator 3 reacts to the command of the data processor 2 with a delay of one transmission cycle. For the data processor 2, this then results in a dead time of two transmission cycles, by which the data processor 2 must process the user data received from the data generator with a delay in order to allow the data generator to respond to commands from the data processor 2.

After the dead time has been determined, the data processor 2 terminates the initialization mode after the second transmission cycle Zyklus 1 and proceeds to the transmission mode.

In the third transmission cycle Zyklus 2, the data processor 2 now enters the operating status command E=1, which indicates the transmission mode, into the first data field of the third processor-data unit. Furthermore, the data processor 2 enters the repeat command R=0 into the first data field of the third processor-data unit. The second data field of the third processor-data unit remains empty.

Alternatively, the data processor 2 may also extend the initialization sequence by further transmission cycles by the data processor 2 sending further processor-data units with the operating status command E=0 in the first data field and a data value from the data sequence in the second data field, with the aid of which a multiple determination of the dead time from the data values in the generator-data units fed back from the data generator after evaluation of the operating status command E=0 is possible. Thus, the data processor 2 may, if necessary, determine fluctuations in the dead time and then take them into account in the delay set in the data processor for processing user data of the data generator 3.

However, the initialization sequence prior to actual data transmission may in principle also be omitted if the data processor 2 knows how many transmission cycles the data generator 3 needs to respond to commands from the data processor 2. The number of transmission cycles by which the processing of user data in the data processor 2 must be delayed compared to the transmission cycle in which the user data was received may then be set directly in the data processor 2.

Due to the evaluation delayed by one transmission cycle, the data generator 3 responds to the third processor-data unit sent by the data processor 2 in the third transmission cycle Zyklus 2 with a third generator-data unit which responds to the second processor-data unit sent in the second transmission cycle Zyklus 1 and comprises the transmission-status command F=0 in the first data field and the mirrored data value X+1 from the second processor-data unit in the second data field. The five user data fields remain empty.

In the transmission mode to which data processor 2 has switched with the third transmission cycle Zyklus 2, the data processor 2 continues to process generator-data units only if the transmission status command F in the first data field with the value 1 indicates that all five user data fields of the generator-data unit comprise data. The third generator-data unit sent by data generator 3 in the third transmission cycle Zyklus 2, which has the transmission-status command F=0 in the first data field, is therefore discarded by data processor 2.

The data processor 2 then continues the transmission mode with the fourth transmission cycle Zyklus 3, in which the data processor 2 sends a fourth processor-data unit that is identical to the third processor-data unit from the third transmission cycle Zyklus 2. The first data field of the fourth processor-data unit again contains the operation status command E=1 and the repeat command R=0. The second data field of the fourth processor-data unit remains empty.

The data generator 3, which in the meantime has evaluated the third processor-data unit indicating to the data generator the change to the transmission mode with the aid of the operating status command E=1, starts to provide user data for the fourth transmission cycle Zyklus 3. As described, the data generator 3 is embodied to provide for each transmission cycle a data packet Data Cycle having four data fields, which is stored in the ring buffer of the data generator 3. The first Data Cycle 1 data packet generated by the data generator 3, which comprises the four data fields D11-D14, is stored in the ring buffer at the first memory address A1.

In the fourth transmission cycle Zyklus 3, the data generator 3 then enters the four data fields D11-D14 of the first data packet Data Cycle 1 into the first four of the five user data fields of the fourth generator-data unit. The fifth user data field remains empty since no further data is provided by the data generator 3 in the ring buffer.

The data generator 3 therefore again enters the transmission-status command F=0 in the first data field of the fourth generator-data unit, which indicates that not all user data fields in the generator-data unit are filled. With the aid of the second data field of the fourth generator-data unit, the data generator 3 transmits, as address value ID, the ring buffer address A1 under which the user data transmitted by the fourth generator-data unit are stored in the ring buffer.

Since in the transmission mode the data processor 2 is set in such a way that when the transmission-status command transmitted from the data generator 3 is F=0, the data processor 2 does not process the data in the user data fields of the generator-data unit, the data processor 2 discards the data in the four user data fields of the fourth generator-data unit.

The fifth transmission cycle Zyklus 4 is started by data processor 2 with the fifth processor-data unit, which corresponds to the fourth processor-data unit from the fourth transmission cycle Zyklus 3. This means that in the first data field of the fifth processor-data unit, the operating status command E is set to the value 1 and the repeat command R is set to the value 0.

After evaluating the fourth processor-data unit, data generator 3 has in the meantime stored a second data packet Data Cycle 2 having four data fields D21-D24 in the ring buffer. In the ring buffer of data generator 3, the first eight data fields are now occupied by the first data packet Data Cycle 1 and the second data packet Data Cycle 2 generated by the data generator 3.

In the transmission mode, the data generator 3 is set in such a way that when the first data field of the preceding transmitted generator-data unit indicates 0 for the transmission-status command F, the data in the user data fields of the generator-data unit is repeated in the user data fields of the next generator-data unit.

Since the five user data fields in the fourth generator-data unit were not completely filled with data and the transmission-status command F was therefore set to the value 0, the data generator 3 enters the four data fields D11-D14 of the first data packet Data Cycle 1 and the first data field D21 of the second data packet Data Cycle 2, which are stored at the first ring buffer address A1, into the five user data fields of the fifth generator-data unit.

The transmission-status command F in the first data field of the fifth generator-data unit now receives the value 1, which indicates that the five user data fields of the fifth generator-data unit are completely occupied with data. In the second data field of the fifth generator-data unit, the first memory address A1 of the ring buffer is again specified as address value ID.

If, as in the first sequence in FIG. 3, no errors occur in the data transmission of the generator-data units, the data processor 2 sends an identical processor-data unit in the further transmission cycles, which in the first data field has the operating status command E=1, which stands for the data transmission operating mode, and the repeat command R=0, which indicates that the data transmission was carried out without errors in the previous transmission cycle. The second data field of the processor-data unit, however, remains empty. FIG. 3 shows the corresponding sixth to ninth processor-data units for the sixth transmission cycle Zyklus 5 to ninth transmission cycle Zyklus 8.

The data generator 3 provides a further data packet Data Cycle for each of the further transmission cycles after evaluating the processor-data unit from the previous transmission cycle. As may be seen from the first sequence shown in FIG. 3, the data generator 3 generates the third data packet Data Cycle 3 with the four data fields D31-D34 for the sixth transmission cycle Zyklus 5, the fourth data packet Data Cycle 4 with the four data fields D41-D44 for the seventh transmission cycle Zyklus 6, the fifth data packet Data Cycle 5 with the four data fields D51-D54 for the eighth transmission cycle Zyklus 7, and the sixth data packet Data Cycle 6 with the four data fields D61-D64 for the ninth transmission cycle Zyklus 8.

The data fields of the ring buffer in the data generator 3 are then completely filled at the second memory address A2 in the sixth transmission cycle Zyklus 5, at the third memory address A3 in the seventh transmission cycle Zyklus 6, and at the fourth ring buffer address A4 in the eighth transmission cycle Zyklus 7. The data generator 3 transmits the transmission-status command F=1 in the first data field of the sixth, seventh and eighth generator-data units corresponding to the fifth generator-data unit, which indicates five completely filled user data fields in the corresponding generator-data unit. The second data field then indicates the transmitted ring buffer address ID in each case, for the sixth generator-data unit the second buffer address A2, for the seventh generator-data unit the third buffer address A3 and for the eighth generator-data unit the fourth ring buffer address A4.

In the five further user data fields of the sixth, seventh and eighth generator-data unit, the data stored under the ring memory addresses specified in the second data field are then entered by the data generator 3. For the sixth generator-data unit, these are the three data fields D22-D24 of the second data packet Data Cycle 2 and the first two data fields D31-D32 of the third data packet Data Cycle 3 remaining after the fifth generator-data unit. In the five user data fields, the seventh generator-data unit comprises the remaining two data fields D33-D34 of the fourth data package Data Cycle 4 and the first three data fields D41-D43 of the fourth data package Data Cycle 4. The five user data fields of the eighth generator-data unit comprise the remaining data field D44 of the fourth data package Data Cycle 4 and the four data fields D51-D54 of the fifth data package Data Cycle 5.

In the ninth transmission cycle Zyklus 8, only the sixth data packet Data Cycle 6 with four data fields D61-D64 is available to the data generator 3 for user data transmission with the ninth generator-data unit in the ring buffer at the fifth ring buffer address A5, which the data generator 3 enters in the second data field of the ninth generator-data unit. The last data field of the fifth ring buffer address A5 is not occupied, which is why the data generator 3 transmits a generator-data unit that is not completely filled in the ninth transmission cycle Zyklus 8, analogously to the fourth transmission cycle Zyklus 3.

In the first data field of the ninth generator-data unit, the data generator 3 therefore enters F=0 as the transmission-status command to indicate the non-complete data allocation of the five user data fields. Analogous to the fourth generator-data unit, data processor 2 then discards the data transmitted with the ninth generator-data unit. Subsequently, the data transmission, which is no longer shown in the first sequence in FIG. 3, is then continued analogously to the fifth data transmission cycle Zyklus 4 in the tenth transmission cycle Zyklus 9 with a repetition of the transmission of the data stored at the fifth ring memory address A5, wherein, due to the seventh data packet Data Cycle 7 generated in the meantime by the data generator with the four data fields D71-D74, all data fields of the ring memory address A5 are filled. In the following, four further transmission cycles are then carried out, with the aid of which the data fields of the sixth to eighth ring memory addresses A6-A8 completely filled by the data generator with the eighth to tenth data packets Data Cycle 8-10 are transmitted.

In the first sequence of transmission cycles shown in FIG. 3, the data units are transmitted without errors between the data generator 3 and the data processor 2 on the data-transmission channel 1. The data transmission is embodied in such a way that the amount of data generated by the data generator 3 for five transmission cycles may be transmitted in four transmission cycles. Of the five transmission cycles that make up a communication cycle, one transmission cycle is therefore always redundant.

In an error-free transmission, a transmission cycle of five transmission cycles is thus not always used by the data processor to process the transmitted user data at any time. In this redundant transmission cycle, at least one empty user data field is provided in the generator-data unit transmitted from the data generator to the data processor. The data generator 3 indicates this with the transmission-status command F=0. The data processor 2 is then set to discard the data transmitted in the generator-data unit and wait for the next completely transmitted generator-data unit.

With the aid of the redundant transmission cycle, it is possible to repeat a transmission cycle within a communication cycle if a data transmission error occurred in the transmission cycle without having to increase the bandwidth of the communication cycle, as shown in the second sequence of transmission cycles in FIG. 4.

FIG. 4 shows ten transmission cycles that represent two communication cycles. In the second sequence shown in FIG. 4, the first four transmission cycles Zyklus 0 to 3 of the first sequence are shown in FIG. 3, which, as explained, serve to determine dead time in initialization mode and start the first communication cycle for user data transmission at the beginning of transmission mode. In FIG. 4, however, the subsequent tenth to fifteenth transmission cycles Zyklus 9 to 13 are shown in addition to the fifth to ninth transmission cycles Zyklus 4 to 8.

Furthermore, FIG. 4 also shows the eighth to twelfth data packets Data Cycle 8-12 provided by the data generator 3 for the tenth to fourteenth transmission cycles Zyklus 4 to 13, respectively. As shown in the second sequence shown in FIG. 4, the data generator 3 generates the eighth data packet Data Cycle 8 with the four data fields D81-D84 for the tenth transmission cycle Zyklus 9, and the ninth data packet Data Cycle 9 with the four data fields D91-D94 for the eleventh transmission cycle Zyklus 10, the tenth data package Data Cycle 10 with the four data fields D101-D104 for the twelfth transmission cycle Zyklus 11, the eleventh data package Data Cycle 11 with the four data fields D111-D114 for the thirteenth transmission cycle Zyklus 12, and the twelfth data package Data Cycle 12 with the four data fields D121-D124 for the fourteenth transmission cycle Zyklus 13.

In the second sequence of transmission cycles shown in FIG. 4, the data transmission then runs without errors in the fifth transmission cycle Zyklus 4, analogously to the first sequence of transmission cycles shown in FIG. 3. In the following, sixth transmission cycle Zyklus 5, however, the transmission of the sixth generator-data unit to the data processor 2 is then faulty. The faulty transmission of the sixth generator-data unit in the sixth transmission cycle Zyklus 5 is graphically indicated by a lightning symbol in FIG. 4.

To the faulty data transmission in the sixth transmission cycle Zyklus 5 in the seventh transmission cycle Zyklus 6, the data processor 2 reacts by setting the repeat command R to the value 1 in the first data field of the seventh processor-data unit, contrary to the seventh processor-data unit in the first sequence shown in FIG. 3, in order to indicate that an error occurred in the data transmission in the preceding sixth transmission cycle Zyklus 5. In addition, the data processor 2 indicates the second ring buffer address A2 as address value in the second data field of the seventh processor-data unit under which the user data fields of the sixth generator-data unit transmitted with errors are stored.

Since the data generator 3 responds to commands from the processor-data unit with a delay of one transmission cycle, in response to the preceding sixth processor-data unit from the sixth transmission cycle Zyklus 5, which indicated an error-free transmission with the repeat command R=0, the data generator 3 in the seventh transmission cycle Zyklus 6 first transmits the data fields stored at the third ring memory address A3 with the seventh generator-data unit, which are then received by the data processor 2 without errors.

Therefore, in the eighth transmission cycle Zyklus 7, the data processor 2 as the eighth processor-data unit then again sends the repeat command R=0 in the first data field, which confirms the error-free data transmission of the seventh generator-data unit. Alternatively, it is also possible that, as long as there is no error-free transmission of the data fields stored in the ring buffer at the second ring buffer address A2, the data processor 2 repeats in the further processor-data units the seventh processor-data unit transmitted in the seventh transmission cycle Zyklus 6, which indicates the error-free data transmission of the sixth generator-data unit with the repeat command R=1 in the first data field and the second ring buffer address A2 in the second data field.

In the eighth data transmission cycle Zyklus 7, the data generator 3 responds to the repeat command R=1 in the seventh processor-data unit and repeats the sixth generator-data unit with the eighth generator-data unit by transmitting the data fields stored at the second ring memory address A2 having the five user data fields of the eighth generator-data unit.

In the ninth transmission cycle Zyklus 8, the data transmission is then continued in a regular manner, wherein, due to the repetition of the sixth transmission cycle Zyklus 5 in the second sequence shown in FIG. 4, which took place in the eighth transmission cycle Zyklus cycle 7, a data transmission corresponding to the eighth transmission cycle Zyklus 7 of the first sequence shown in FIG. 3 takes place, in which the data fields stored at the fifth ring memory address A5 are transmitted with the five user data fields of the ninth generator-data unit.

The first communication cycle is thus completed, and the redundant ninth transmission cycle Zyklus 8, in contrast to the first sequence shown in FIG. 3, is used in the second sequence shown in FIG. 4 for user data transmission in the first communication cycle, which are processed by the data processor 2, due to the repetition of the erroneous transmission in the seventh transmission cycle Zyklus 6.

In the second sequence shown in FIG. 4, the tenth transmission cycle Zyklus 9 then runs without errors again, analogous to the first sequence shown in FIG. 3. In the second sequence shown in FIG. 4, however, an error then occurs again in the eleventh transmission cycle Zyklus 10 during the transmission of the eleventh generator-data unit, which is indicated by a further lightning symbol.

The data processor 2 responds to this further transmission error in the twelfth transmission cycle Zyklus 11 with the twelfth processor-data unit, which displays the repeat command R=1 in the first data field and the ring buffer address A6 of the preceding erroneously transmitted eleventh generator-data unit in the second data field.

The data generator unit 3 repeats the eleventh generator-data unit from the eleventh transmission cycle Zyklus 10 as the thirteenth generator-data unit in the thirteenth transmission cycle Zyklus 12. The fourteenth transmission cycle Zyklus 13 then completes the second communication cycle with the shifted transmission of the data fields stored at the eighth ring buffer address A8.

Thus, as shown in the second sequence in FIG. 4, in each communication cycle with the one redundant transmission cycle, a transmission repeat may be performed in the event of a faulty data transmission in one of the other transmission cycles.

In the example shown in FIG. 3 and FIG. 4, the first amount of data that may be transmitted in a transmission cycle exceeds the second amount of data generated by the data generator 3 for a transmission cycle by a quarter or, expressed as a percentage, by 25%. In principle, the first amount of data and the second amount of data may be matched such that the percentage by which the first amount of data exceeds the second amount of data is equal to the second amount of data multiplied by n, wherein n is an integer larger than 1. The bandwidth of the communication cycle in the data-transmission system is n+1 transmission cycles, wherein one of the n+1 transmission cycles is redundant with respect to the transmission of the amount of data provided by the data generator 3 for the n+1 transmission cycles and may be used for repeating the transmission of data from a transmission cycle detected as faulty.

However, it is not essential that the percentage by which the first amount of data exceeds the second amount of data be exactly equal to the second amount of data multiplied n times. The bandwidth of the communication cycle in the data-transmission system is then the number of transmission cycles required to transmit a further second amount of data with the first amount of data in addition to the second amount of data transmitted in each transmission cycle, supplemented by a further transmission cycle. In each communication cycle, there is always a redundant transmission cycle, which makes it possible to transmit data again from a transmission cycle detected as faulty.

In the example shown in FIG. 3 and FIG. 4, the data processor 2 discards the data received from the data generator 3 in a transmission cycle if the data generator 3 transmits less than the first amount of data in the transmission cycle. This procedure, prevents the data processor 2 from processing twice the data transmitted twice during an error-free transmission in a communication cycle due to the redundant transmission cycle.

The behavior of the data processor 2 is controlled via the transmission-status command F, which indicates with the value 0 that the user data fields of the generator-data unit are not completely occupied by data, and which indicates with the value 1 that the user data fields of the generator-data unit are completely occupied by data. Alternatively, the transmission-status command F may also always specify the exact number of occupied user data fields of the generator-data unit, which the data processor 2 then evaluates, as a value.

Basically, it must be ensured that if data is received multiple times in a communication cycle, the data processor 2 processes this data only once. In this context, the data processor 2 must determine whether the data received in a transmission cycle from the data generator 3 is already known from a preceding transmission cycle and is available to the data processor 2. The data processor 2 then discards either the data already present or the data received again.

In addition to the possibility of a repetition controlled by the data processor 2 of a faulty transmitted generator-data unit by the data generator 3 with the repetition command R=0 in the processor-data unit, the data processor 2 may transmit with the processor-data unit further commands which change the amount of data generated in a transmission cycle by the data generator, i.e., which change the number of data fields in data packet Data Cycle provided by the data generator.

Figure 5:
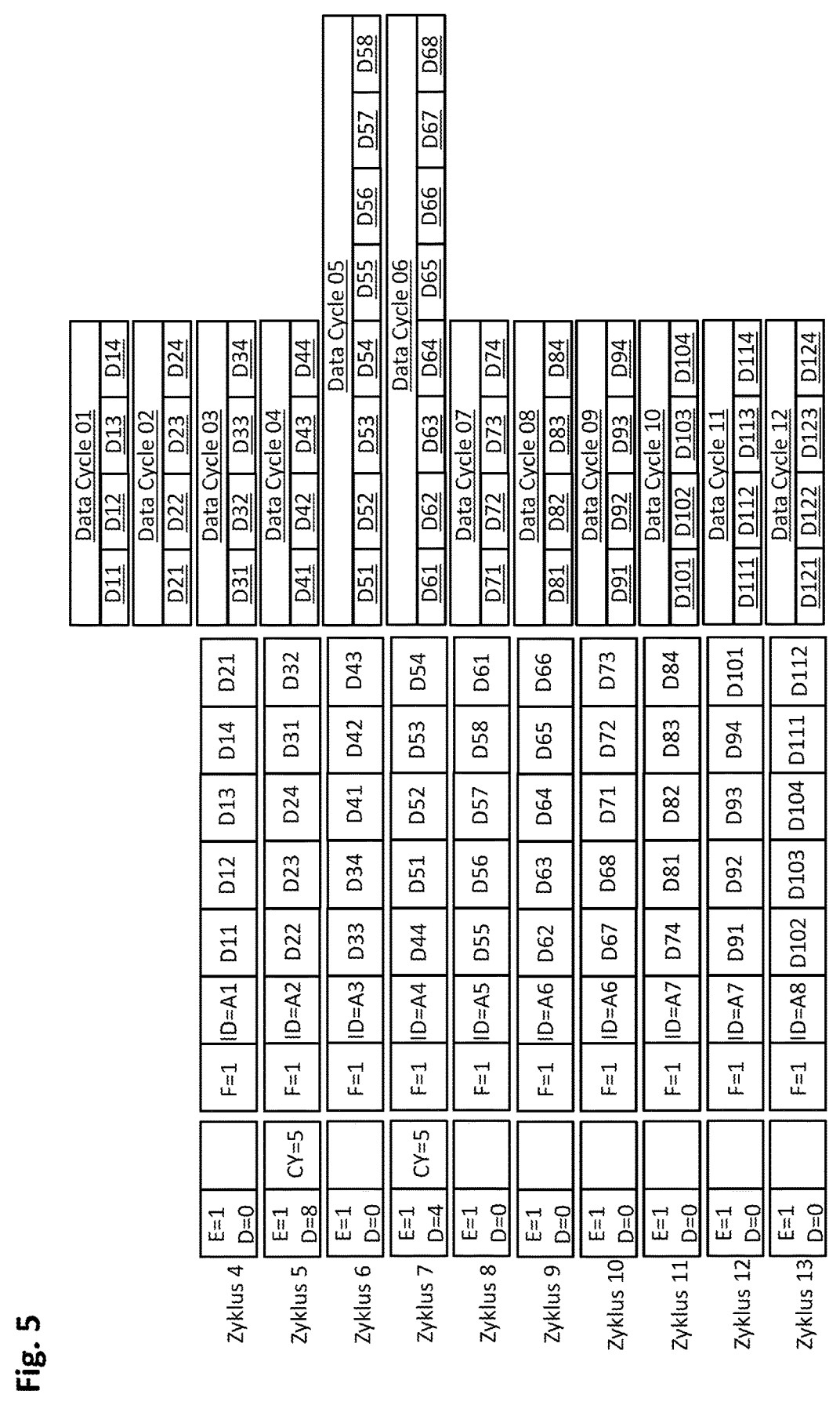

FIG. 5 shows a third sequence of transmission cycles that matches the second sequence shown in FIG. 4. FIG. 5 then again shows ten transmission cycles imaging two communication cycles. The third sequence shown in FIG. 5 also lacks the first four transmission cycles Zyklus 0 to 3 of the first sequence shown in FIG. 3. In FIG. 5 as in FIG. 4, only the fifth to fourteenth transmission cycles Zyklus 4 to 13 are shown. Furthermore, FIG. 5 also shows the first to twelfth data packets Data Cycle 1-12 provided by data generator 3.

In contrast to the second sequence, the third sequence assumes, analogously to the first sequence, that all data transmissions are performed without errors. All processor-data units of the third sequence shown in FIG. 5 therefore contain the repeat command R=0 in the first data field, which, however, is not entered in the first data field of the processor-data units in FIG. 5 for reasons of clarity.

In addition, the first data field of the processor-data unit contains the data command D, which may be used to change the number of data fields to be generated by the data generator 3 in a data packet Data Cycle. The value 0 of the data command D indicates that no change is to be made to the number of data fields to be generated by the data generator 3 in the data packet Data Cycle. On the other hand, an integer number of the data command D other than 0 is interpreted by the data generator 3 as meaning that a number of data fields corresponding to the value are to be provided in the data package Data Cycle.

As in the first and second sequences shown in FIG. 3 and FIG. 4, the data generator 3 is preset in the third sequence shown in FIG. 5 in such a way that the data generator 3 provides a data packet Data Cycle with four data fields for each transmission cycle.

In the third sequence shown in FIG. 5, the first communication cycle starts with the fifth transmission cycle Zyklus 4, analogous to the second sequence shown in FIG. 4, wherein in the first data field of the fifth processor-data unit with the value 0 for the data command D it is indicated that no change is to be made in the number of data fields provided per transmission cycle by the data generator 3 in the data packet data cycle.

In the sixth transmission cycle Zyklus 5, the data processor 2 then indicates in the first data field of the sixth processor-data unit with the value 8 for the data command D that the number of data fields to be provided by the data generator per transmission cycle is to be increased from four data fields to eight data fields. In the second data field of the sixth processor-data unit, the data processor 2 then further specifies from which data packet number CY, in the present case from the data packet Data Cycle with the number 5, the data field number increase is to be implemented.

Due to the evaluation of the data command D=8 of the sixth processor-data unit delayed by one transmission cycle, the data generator 3 then provides the fifth data packet Data Cycle 5 for the eighth transmission cycle Zyklus 7 with eight data fields D51-D58 instead of previously four data fields.

In the seventh transmission cycle Zyklus 6, the data processor 2 then indicates in the first data field of the seventh processor-data unit with the value 0 for the data command D that no further change is to be made to the number of data fields provided per transmission cycle by the data generator 3 in the data packet Data Cycle. The data generator 3 therefore provides the sixth data packet Data Cycle 5 again with eight data fields D61-D68 for the ninth transmission cycle Zyklus 8.

As may be seen from the third sequence shown in FIG. 5, in the eighth transmission cycle Zyklus 7, the data processor 2 then again reduces the number of data fields to be generated by the data generator 3 per transmission cycle to four data fields by entering the value 4 as the value for the data command D in the first data field of the eighth processor-data unit. In the second data field of the eighth processor-data unit, the data processor 2 then further indicates with the data packet number CY=7 that the data generator 3 with the seventh data packet Data Cycle 7 should again provide only four data fields instead of eight data fields.

The data generator 3 then again provides the seventh data packet Data Cycle 7 with four data fields instead of with eight data fields to the eighth processor-data unit due to the evaluation of the data command D=8 delayed by one transmission cycle for the ninth transmission cycle Zyklus 9.

The data-field-generation rate set to four data fields is then maintained by the data processor 2 in the third sequence shown in FIG. 5, in which the data processor 2 indicates an unchanged maintenance of the data field generation rate with the value 0 for the data command D in the further processor-data units.

In the ring buffer of the data generator 3 shown in FIG. 2, in the third sequence shown in FIG. 5 compared to the second sequence shown in FIG. 4, eight additional data fields are then stored from the increased data field generation rate of the data generator 3 for the seventh transmission cycle Zyklus 6 with the fifth data packet Data Cycle 5 and for the eighth transmission cycle Zyklus 7 with the sixth data packet Data Cycle 6. These eight additional data fields D55-D58, D65-D68 will be transmitted from the data generator 3 to the data processor 2 with the two additional redundant transmission cycles of the first and second communication cycles.

This method makes it possible to flexibly control data generation. It is necessary in this context that the ring buffer of the data generator 3 has sufficient memory capacity to accommodate data fields that have not yet been transmitted. This method is particularly advantageous if the data processor 2 processes the user data of the data generator 3 with a higher dead time.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

The invention claimed is:

1. A method for cyclically transmitting data between communication subscribers on a data-transmission channel:

wherein the data-transmission channel is operated at a data-transmission rate with the aid of which a first amount of data is transmissible in each transmission cycle, wherein a communication subscriber acts as a data processor and a further communication subscriber acts as a data generator, wherein the data generator provides a second amount of data for each transmission cycle, and wherein the first amount of data exceeds the second amount of data by a percentage; and wherein the data generator transmits the data provided by the data generator to the data processor at the data-transmission rate of the data-transmission channel, wherein the data processor processes the data received by the data generator on the data-transmission channel with a delay of the number of transmission cycles that the data generator needs in order to react to a command of the data processor, wherein the data processor indicates to the data generator that a transmission cycle is faulty if an error has occurred in the transmission cycle during data transmission with the aid of a repeat command, and wherein the data generator, upon receiving the repeat command, repeats the transmission of the data of the transmission cycle indicated to be faulty by the data processor.

2. The method of claim 1, wherein the percentage by which the first amount of data exceeds the second amount of data is equal to the second amount of data multiplied n times, wherein n is an integer larger than 1, and wherein the data processor discards the data received in a transmission cycle from the data generator if the data generator transmits less than the first amount of data in the transmission cycle.

3. The method according to claim 1, wherein in each transmission cycle the data processor respectively sends a processor-data unit to which the data generator responds in the respective transmission cycle with a generator-data unit, the processor-data unit comprising a data element with the aid of which the repeat command is transmitted.

4. The method according to claim 3, wherein the dead time, which corresponds to the number of transmission cycles which the data generator needs in order to react to a command of the data processor, is determined within the framework of an initialization sequence, wherein the data processor provides a data value sequence in successive processor-data units of the initialization sequence, in which an individual data value is assigned to each transmission cycle of the initialization sequence, wherein the data generator enters the data value into the next generator-data unit sent to the data processor after it has been determined.

5. The method of claim 4, wherein the processor-data unit comprises a data element used to transmit an operational status command indicating that the transmission cycle is part of an initialization sequence or part of a data transmission sequence.

6. The method of claim 3, wherein the processor-data unit comprises a data element that is used to transmit a data command with the aid of which the second amount of data generated by the data generator in a transmission cycle is changeable.

7. The method of claim 3, wherein the generator-data unit comprises a data element used to transmit a transmission-status command indicating whether the data elements provided in the generator-data unit for user data are fully occupied by user data.

8. The method of claim 3, wherein the generator-data unit contains a data element with the aid of which a transmission-status command is transmitted that indicates in the generator-data unit the number of data elements occupied by user data.

9. A data-transmission system for cyclically transmitting data between communication subscribers on a data-transmission channel:

wherein the data-transmission channel is configured to be operated at a data transmission rate at which a first amount of data is transmissible in each transmission cycle, wherein a communication subscriber acts as a data processor and another communication subscriber acts as a data generator, wherein the data generator is configured to provide a second amount of data for each transmission cycle, wherein the first amount of data exceeds the second amount of data by a percentage, wherein the data generator is configured to transmit the data provided by the data generator to the data processor at the data transmission rate of the data-transmission channel, wherein the data processor is configured to process the data received from the data generator on the data-transmission channel with a delay of the number of transmission cycles the data generator needs to respond to a command of the data processor, wherein the data processor the data processor is configured to indicate a transmission cycle as faulty to the data generator with the aid of a repeat command if a fault has occurred in the data transmission in the transmission cycle, and wherein the data generator is configured, upon receiving the repeat command, to repeat the data transmission of the data of the transmission cycle indicated as faulty by the data processor.

10. The data-transmission system of claim 9, wherein the percentage by which the first data amount exceeds the second data amount is equal to the second data amount multiplied n times, where n is an integer greater than 1, and wherein the data processor is configured to discard the data received in a transmission cycle from the data generator if the data generator transmits less than the first data amount in the transmission cycle.

11. The data-transmission system of claim 9, wherein in each transmission cycle the data processor is configured to respectively send a processor-data unit to which the data generator responds in the respective transmission cycle with a generator-data unit, the processor-data unit comprising a data element with the aid of which the repeat command is transmitted.

12. The data-transmission system of claim 11, wherein within the framework of an initialization sequence the dead time corresponding to the number of transmission cycles required by the data generator to respond to a command of the data processor is determined, wherein the data processor is configured to provide, in successive processor-data units of the initialization sequence, a data value sequence in which an individual data value is associated with each transmission cycle of the initialization sequence, wherein the data generator enters the data value in the next generator-data unit sent to data processor after it has been determined.

13. The data-transmission system of claim 12, wherein the data processor is configured to enter into the processor-data unit a data element used to transmit an operational status command indicating that the transmission cycle is part of an initialization sequence or part of a data transmission sequence.

14. The data-transmission system of claim 11, wherein the data processor is configured to enter into the processor-data unit a data element used to transmit a data command with the aid of which the second amount of data generated by the data generator in a transmission cycle is changeable.

15. The data-transmission system of claim 11, wherein the data generator is configured to enter into the generator-data unit a data element used to transmit a transmission-status command indicating whether the data elements provided in the generator-data unit for user data are completely occupied by user data.

16. The data-transmission system of claim 11, wherein the data generator is configured to enter into the generator-data unit a data element with the aid of which a transmission-status command is transmitted that indicates in the generator-data unit the number of data elements occupied by user data.

17. The data-transmission system of claim 9, wherein the data generator comprises a buffer for holding the generated second amount of data in the form of a ring buffer.

18. A method for cyclically transmitting data between communication subscribers on a data-transmission channel:
   wherein the data-transmission channel is operated at a data-transmission rate with the aid of which a first amount of data is transmissible in each transmission cycle,
   wherein a communication subscriber acts as a data processor and a further communication subscriber acts as a data generator,
   wherein the data generator provides a second amount of data for each transmission cycle, and
   wherein the first amount of data exceeds the second amount of data by a percentage,
   wherein the percentage by which the first amount of data exceeds the second amount of data, when multiplied by n, at least corresponds to the second amount of data, n being an integer larger than 1; and
   wherein the data generator transmits the n+1 first amounts of data provided by the data generator to the data processor for a communication cycle of n+1 transmission cycles at the data-transmission rate of the data-transmission channel in such a way that the n+1 amounts of data provided by the data generator for the communication cycle of n+1 transmission cycles are transmitted in n transmission cycles having n second amounts of data on the data-transmission channel, so that a transmission cycle of the n+1 transmission cycles of the communication cycle on the data-transmission channel with the second amount of data is redundant with regard to a transmission of data of the n+1 first amount of data provided by the data generator for the n+1 transmission cycles of the communication cycle and adapted for a repetition of the transmission of the second amount of data from a transmission cycle of the already performed transmission cycles indicated to be faulty on the data-transmission channel,
   wherein the data processor processes the data received by the data generator on the data-transmission channel with a delay of the number of transmission cycles that the data generator needs in order to react to a command of the data processor,
   wherein the data processor indicates to the data generator that a transmission cycle is faulty if an error has occurred in the transmission cycle during data transmission with the aid of a repeat command, and
   wherein the data generator, upon receiving the repeat command, repeats the transmission of the transmission cycle in the communication cycle indicated to be faulty by the data processor.

\* \* \* \* \*